(12) United States Patent
Jagos et al.

(10) Patent No.: US 7,246,987 B2
(45) Date of Patent: Jul. 24, 2007

(54) SOLID MOTOR TRANSPORT TRAILER WITH ROTATABLE CHOCK SUPPORTS

(75) Inventors: Roderick B. Jagos, Melbourne, FL (US); Steve S. Lo, Merritt Island, FL (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 10/671,372

(22) Filed: Sep. 24, 2003

(65) Prior Publication Data

US 2005/0063795 A1   Mar. 24, 2005

(51) Int. Cl.
B65G 47/22   (2006.01)
B65G 1/00   (2006.01)

(52) U.S. Cl. .................. 414/754; 414/332; 414/919; 414/288; 244/63

(58) Field of Classification Search ............ 414/754, 414/411, 491, 495, 469, 786, 430, 346, 477, 414/590, 911, 919, 332, 403, 395, 288, 304, 414/22.54, 22.55, 22.57, 22.59; 280/414, 280/426, 414.5; 89/1.804, 1.805, 1.815, 89/1.801, 1.802; 29/824; 410/47–50; 244/63, 244/171.6, 1.801–1.802
See application file for complete search history.

(56) References Cited

U.S. PATENT DOCUMENTS

| | | | | | |
|---|---|---|---|---|---|
| 2,535,546 | A | * | 12/1950 | Pitts | 414/22.57 |
| 2,982,395 | A | * | 5/1961 | Rados | 206/319 |
| 3,038,614 | A | * | 6/1962 | Morley et al. | 414/590 |
| 3,067,884 | A | * | 12/1962 | Williams | 414/497 |
| 3,262,664 | A | * | 7/1966 | Paraskewik | 410/49 |
| 3,970,295 | A | * | 7/1976 | Cooper | 269/17 |
| 4,699,337 | A | * | 10/1987 | Lewis | 244/137.1 |
| 5,924,648 | A | * | 7/1999 | Ellinthorpe | 244/63 |
| 6,106,209 | A | * | 8/2000 | Krenek | 414/24.5 |
| 6,170,141 | B1 | * | 1/2001 | Rossway et al. | 29/281.1 |
| 6,390,759 | B1 | * | 5/2002 | Novak et al. | 414/430 |

* cited by examiner

Primary Examiner—Gene O. Crawford
Assistant Examiner—Gregory W. Adams
(74) Attorney, Agent, or Firm—Ingrassia Fisher & Lorenz, P.C.

(57) ABSTRACT

Methods and apparatus are provided for transporting a solid rocket motor, rocket or other object. A transport for an object suitably includes a trailer having a longitudinal axis. A tail support coupled to the trailer has a notch configured to receive a pin affixed to the object to prevent movement along the longitudinal axis during transport. A chock assembly includes a chock and a trolley, wherein the chock is configured to accept the solid rocket motor and to pivot about a rotation axis that is substantially perpendicular to the longitudinal axis of the trailer. By pivoting with the object, the rotable chock maintains intimate contact with the object during transport and/or elevation, thereby improving response to flexing of the transport and reducing the possibility of damage to the object.

11 Claims, 6 Drawing Sheets

SOLID MOTOR TRANSPORT TRAILER WITH ROTATABLE CHOCK SUPPORTS

TECHNICAL FIELD

The present invention generally relates to transports for rocket engines and other large objects, and more particularly relates to a transport with a rotatable chock support.

BACKGROUND

Rocket engines remain the primary launch engines for satellites, manned and unmanned space vehicles and the like. The solid rocket motors (SRMs) used in space shuttle launches, for example, each burn for about two minutes and generate about 3.3 million pounds of thrust. Other rocket engines (such as the Delta series rockets manufactured by the Boeing Company) are designed to propel large payloads (e.g. on the order of thirteen tons or more) into space with relatively short setup times (e.g. ten to twenty days).

Rocket-type propulsion engines are typically relatively difficult to transport from place to place (e.g. from a manufacturing or storage site to the launch site) due to their sheer size. The solid rocket motors used in space shuttle launches, for example, are approximately forty yards in length and about four yards in diameter, and weigh approximately seventy tons even when unloaded. Delta series rockets, as well as other types of rockets, are even larger (e.g. on the order of eighty yards in length or more) and therefore can be similarly unwieldy to transport.

Rocket engines are typically transported on a flatbed-type trailer that can be pulled by a semi-truck or railroad engine. These trailers, however, are generally relatively rigid, and flexing of the trailer during transport may result in localized loading and other stresses that could result in damage to the exterior of the engine. The risk of localized loading and associated damage to the engine is also present when the rocket engine is erected from the trailer to the upright launch position.

Accordingly, it is desirable to create a transport for rocket engines and other objects that is resistant to localized loading conditions. In addition, it is desirable to create a chock for a transport that is resistant to localized loading conditions. Furthermore, other desirable features and characteristics of the present invention will become apparent from the subsequent detailed description and the appended claims, taken in conjunction with the accompanying drawings and the foregoing technical field and background.

BRIEF SUMMARY

Methods and apparatus are provided for transporting a solid rocket motor, rocket or other object. In an exemplary embodiment, a transport for an object suitably includes a trailer having a longitudinal axis. A tail support coupled to the trailer appropriately has a notch configured to receive a pin affixed to the object to prevent movement along the longitudinal axis during transport, and to allow the object to pivot about the tail support during elevation. A chock assembly includes a chock and a trolley, wherein the chock is configured to accept the solid rocket motor and to pivot about a rotation axis that is substantially perpendicular to the longitudinal axis of the trailer. By pivoting with the object during transport and/or elevation, the rotable chock maintains intimate contact with the object during transport and/or elevation, thereby improving response to flexing of the transport and/or reducing the possibility of damage to the object.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various embodiments, a transport for a missile, rocket or other object is provided with a chock or other support that is rotatable about an axis perpendicular to the long axis of the transport. The chock compensates for flexing in the transport by rotating to thereby maintain intimate contact with the object during transport and/or elevation of the object, as described more fully below. Although the invention is primarily described herein with respect to transports for rocket engines such as SRMs, the structures and concepts described herein may be readily implemented and/or adapted for use in transporting many other equivalent objects such as terrestrial or aerospace vehicles, construction materials (e.g. beams or girders), utility poles or any other objects. Any of these objects may be used in place of the "engine" referenced herein in a wide array of equivalent embodiments.

As used herein, the term "substantially" is intended to encompass the specified ranges or values, as well as any variations due to manufacturing, design, implementation and/or environmental effects, as well as any other equivalent values that are consistent with the concepts and structures set forth herein. Although numerical tolerances for various structures and components will vary widely from embodiment to embodiment, equivalent values will typically include variants on the order of plus or minus fifteen percent or more from those specified herein.

Figure 1:
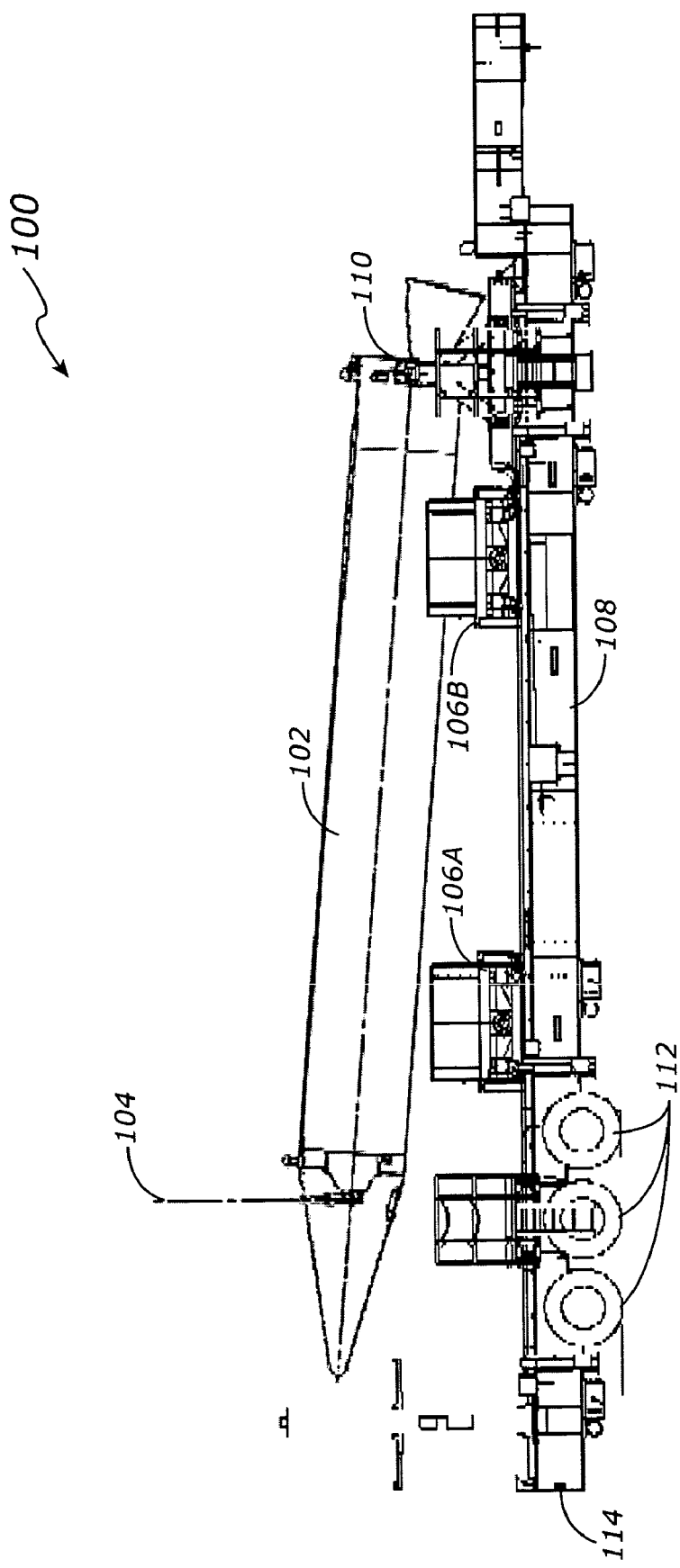
FIG. 1 is a side view of an exemplary transport for a rocket engine.

With initial reference to FIG. 1, an exemplary transport 100 for a rocket engine 102 or other object suitably includes a trailer 108, a tail support member 110 and one or more chocks 106A-B. Rocket engine 102 is appropriately supported by tail support member 110 and by chocks 106A-B during transit, and is elevated into the launch position by a crane or other lift 104 as described more fully below. Transport 100 may also include a lift 114 for supporting chocks 106A-B during elevation as appropriate.

Trailer 108 is any platform or other support capable of supporting the mass of rocket engine 102 above the ground during transit. In various embodiments, trailer 108 is a so-called "fifth wheel"-type trailer that can be pulled by a truck, tractor or the like, as shown in FIG. 1. Alternatively, trailer 108 may be implemented with a railroad car, shipping frame suitable for airborne or seaborne transit, or the like. Trailer 108 may be fashioned with an appropriate number of wheels 112, treads or similar locomotive elements to allow transport on roads, railroad tracks or the like.

Figure 2:
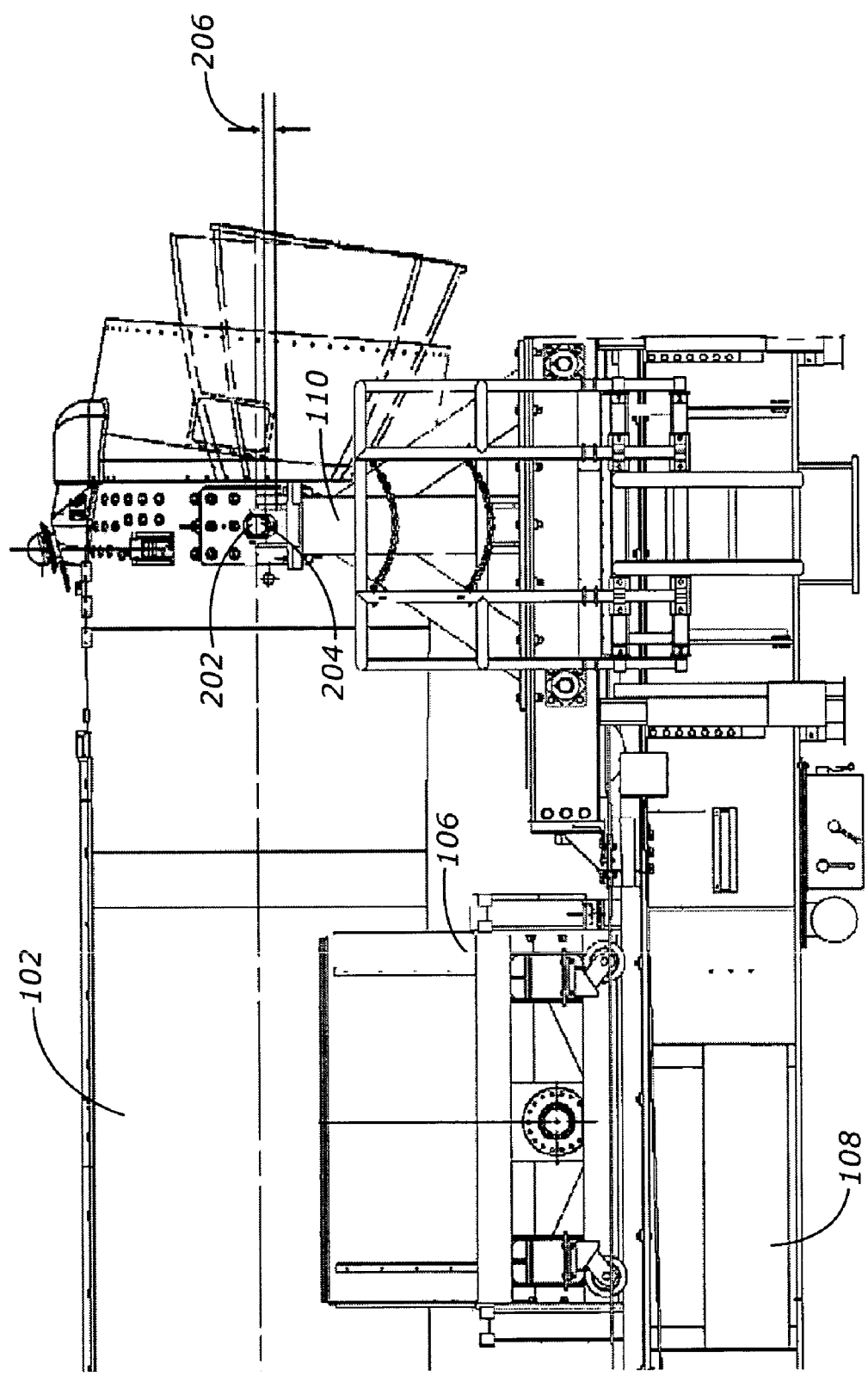
FIG. 2 is a side view showing additional detail of a tail support and chock assembly for a rocket engine transport.
Figure 3:
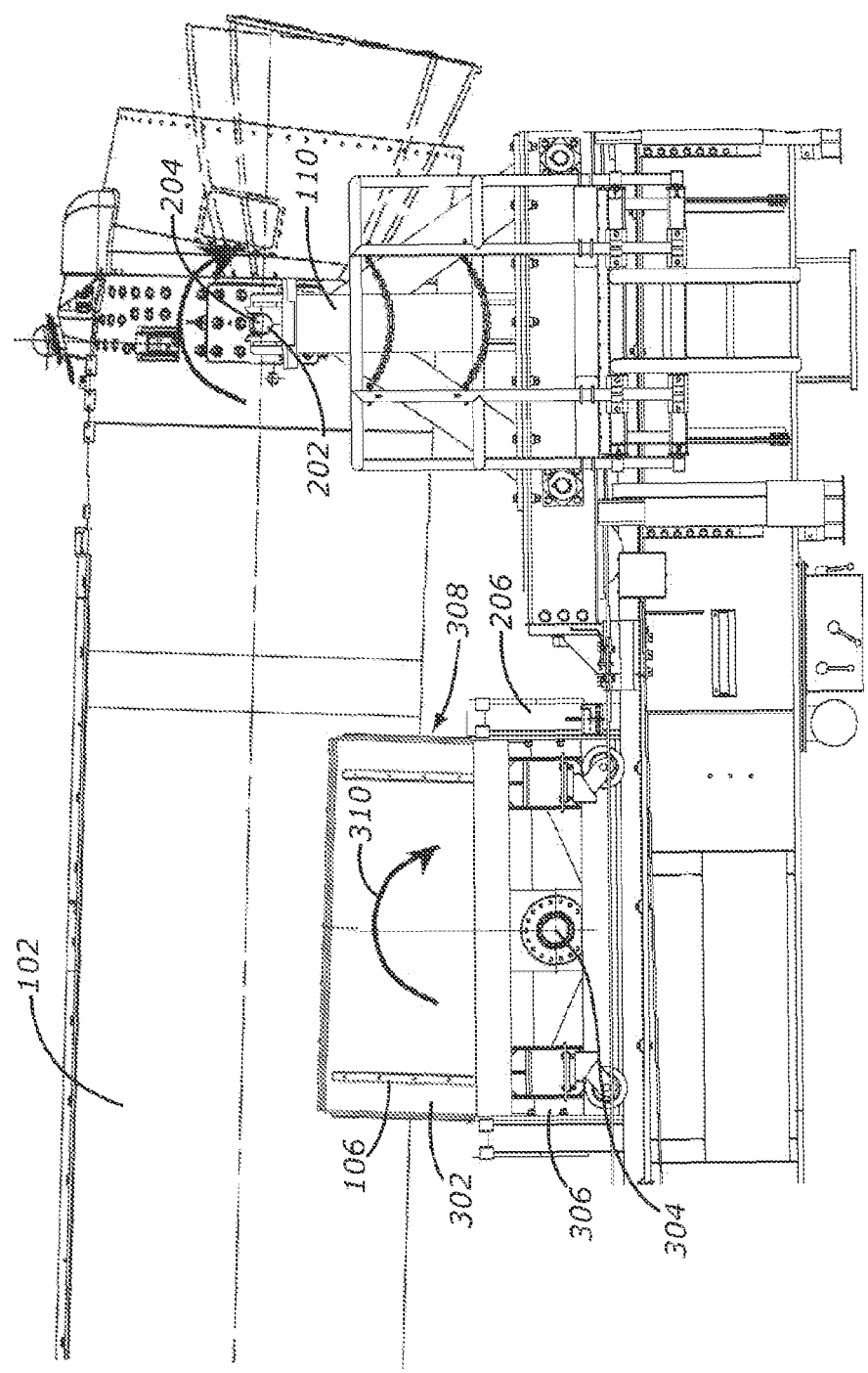
FIG. 3 is a side view of the tail support and chock assembly during elevation of the FIG. 4 is an exploded view of an exemplary chock assembly.

Tail support member 110 is any structure capable of supporting an end portion of rocket motor 102 during transit. In an exemplary embodiment, tail support member 110 includes a notch that is capable of receiving one or more pins fashioned on rocket motor 102 to prevent movement along the long axis of the motor. Tail support member 110 may be integrally formed with trailer 108, or may be attached to trailer 108 in any manner. FIGS. 2 and 3 provide additional detail about an exemplary support member 110, and are discussed more fully below.

With continued reference to FIG. 1, chocks 106A-B are any support structures capable of physically supporting engine 102 above trailer 108 during transit. In an exemplary embodiment, chocks 106A-B are provided as part of a chock assembly that includes a chock and a trolley interconnected by a hinge or other pivotable joint. In such embodiments, the chock is free to rotate with engine 102 to thereby maintain intimate contact between engine 102 and chock 106 during transit and/or elevation of engine 102, as described below. Although FIG. 1 shows a transport 100 with two chocks 106A-B, alternate embodiments may be provided with a single chock or with additional chocks, some or all of which may contain the ability to pivot as described herein. Chocks 106 may be further provided with a rubberized or other movement-retarding surface to further reduce lateral movement of engine 102, to absorb minor protuberances of the engine surfaces, and to absorb alignment tolerances between chocks 106 and rocket engine 102. Similarly, a strap or other tie structure may be provided to maintain engine 102 in position during transit.

During transit, engine 102 suitably rests on chocks 106 and is captured longitudinally at tail support member 110. Engine 102 is elevated into launch position by lifting the forward end of rocket 102 with a crane or other lift 104, as appropriate. As the forward end of the rocket is elevated away from chock 106A, the aft end of engine 102 pivots on chock 106B to engage tail support member 110, as appropriate. Engine 102 then pivots on support member 110 to separate the body of engine 102 above and away from chock 106B. Either or both of chocks 106A-B suitably pivot with engine 102 to maintain relatively flush contact during elevation, and to prevent localized loading on the edges of chocks 106A-B that could potentially damage the skin or other outer surface of engine 102.

In a further embodiment, trailer 108 includes a track or other guide that allows tail support member 110 and/or chocks 106A-B to move laterally in the direction parallel to the long axis of trailer 108. In such embodiments, tail support section 110 and chocks 106A-B move along the track toward lift 114 until engine 102 is fully erect. Lift 114 suitably receives chocks 106A-B and stores them as appropriate to allow movement of engine 102. Additional detail about the lateral mobility of chocks 106 and/or tail support section 110 is provided below in conjunction with FIG. 6.

Referring now to FIG. 2, tail support member 110 and chock 106 suitably maintain engine 102 in position above trailer 108 during transit. As briefly mentioned above, tail support member 110 suitably includes a receptacle, groove or other notch 204 for receiving a pin 202 coupled to rocket 102 and to allow rotation during elevation of engine 102. In a further embodiment, chocks 106 support the bulk of the weight of engine 102. That is, chocks 106 may be vertically oriented to maintain engine 102 at a vertical height that creates a gap 206 between pin 202 and notch 204. Although gap 206 may be of any size, in an exemplary embodiment gap 206 is on the order of an inch or so. Gap 206 creates a mechanical isolation between pin 202 and notch 204 such that notch 204 is not needed to support the weight of engine 102 during transit.

FIG. 3 shows the transport 100 of FIG. 2 as engine 102 becomes slightly elevated toward the upright launch position. As the forward end of engine 102 is lifted (e.g. by lift 104 in FIG. 1), pin 202 settles into notch 204 to support rotation about pin 202, thereby reducing or eliminating gap 206 shown in FIG. 2. This condition previously resulted in momentary but very heavy localized loading along edge 308 of chock assembly 106 until engine 102 was sufficiently rotated to clear the chock. To prevent such loading, chock assembly 106 is suitably fashioned with a chock receptacle 302 that interfaces with engine 102 and that rotates with respect to a trolley 306 during elevation. Because chock 302 is free to rotate about a rotation point 304 on trolley 306, chock 302 remains in intimate contact with engine 102 during elevation. Accordingly, the weight of engine 102 remains distributed across chock 302, rather than being borne solely by edge 308.

Figure 4:
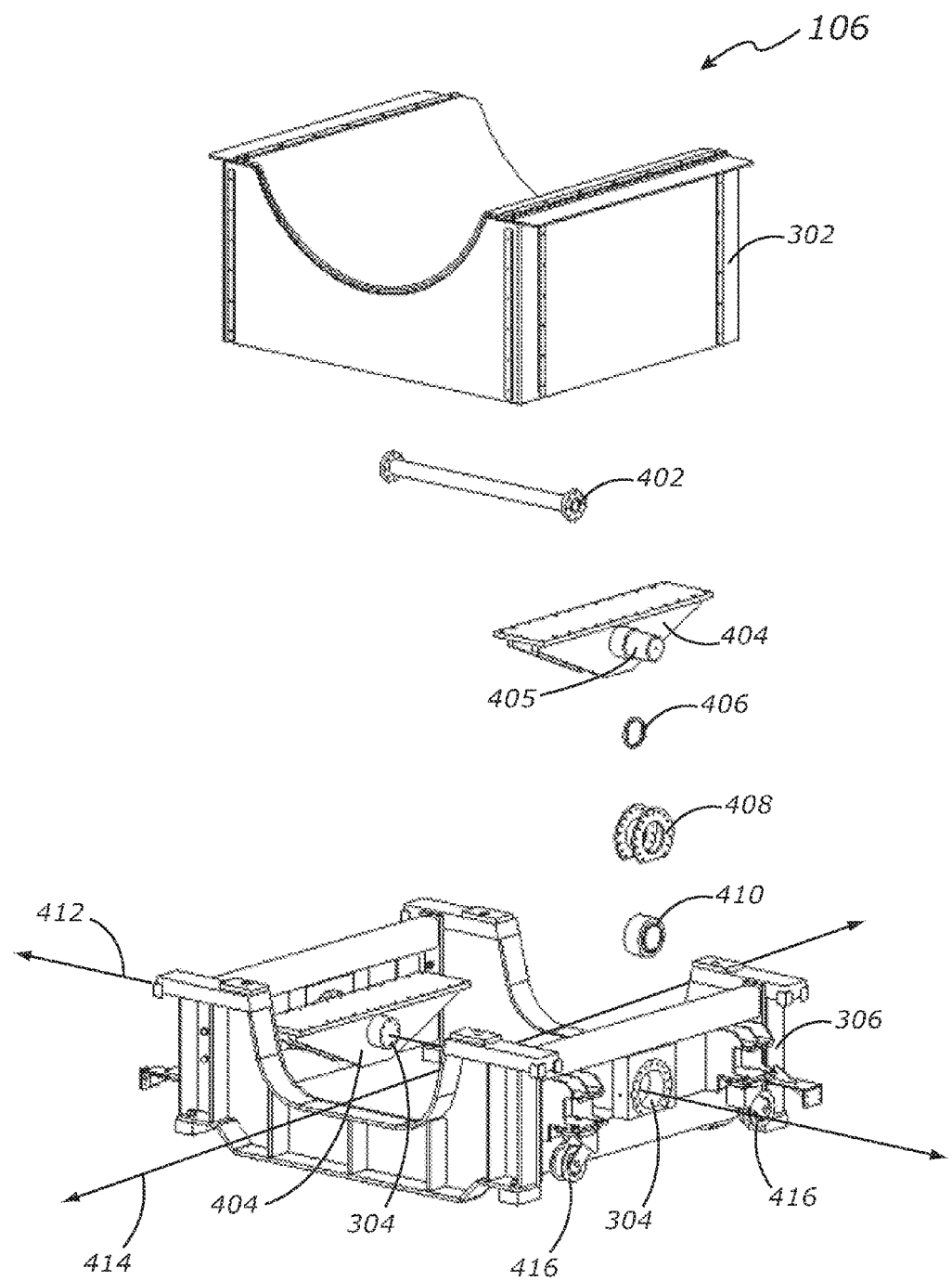

Chock 302 is attached to trolley 306 in any appropriate manner to allow rotation with engine 102. In an exemplary embodiment, chock 302 is attached to trolley 306 with a shaft having spherical bearings at either end to allow rotation while withstanding thrust and radial loads during transport. With reference now to FIG. 4, an exemplary chock assembly 106 suitably includes a chock 302 coupled to a trolley 306 via one or more cradle assemblies that may be joined together by a coupling shaft 402. The cradle assembly suitably includes a bearing assembly 410 housed within a ring support 408 and attached to a support bracket 404 attached to chock 302. Each cradle assembly may also include a thrust spacer 406 to absorb axial loads along axis 412 as appropriate.

In the exemplary embodiment shown in FIG. 4, chock 302 is bolted or otherwise fastened to two support brackets 404, each of which include a cradle assembly to allow rotation about a conceptual axis 412 that is approximately perpendicular to an axis 414 running approximately parallel to the long axes of transport 100 (FIG. 1) and of engine 102. In such embodiments, each support bracket 404 includes (or is attached to) a trunnion 405 that is able to interact with bearing assembly 410 to allow rotation about pivot points 304. The two cradle assemblies therefore create two pivot points 304 on trolley 306 about which chock 302 is free to pivot. Trolley 306 may also include any number of wheels 416, slides or other components to allow movement along the track provided by trailer 112, discussed above.

Figure 5:
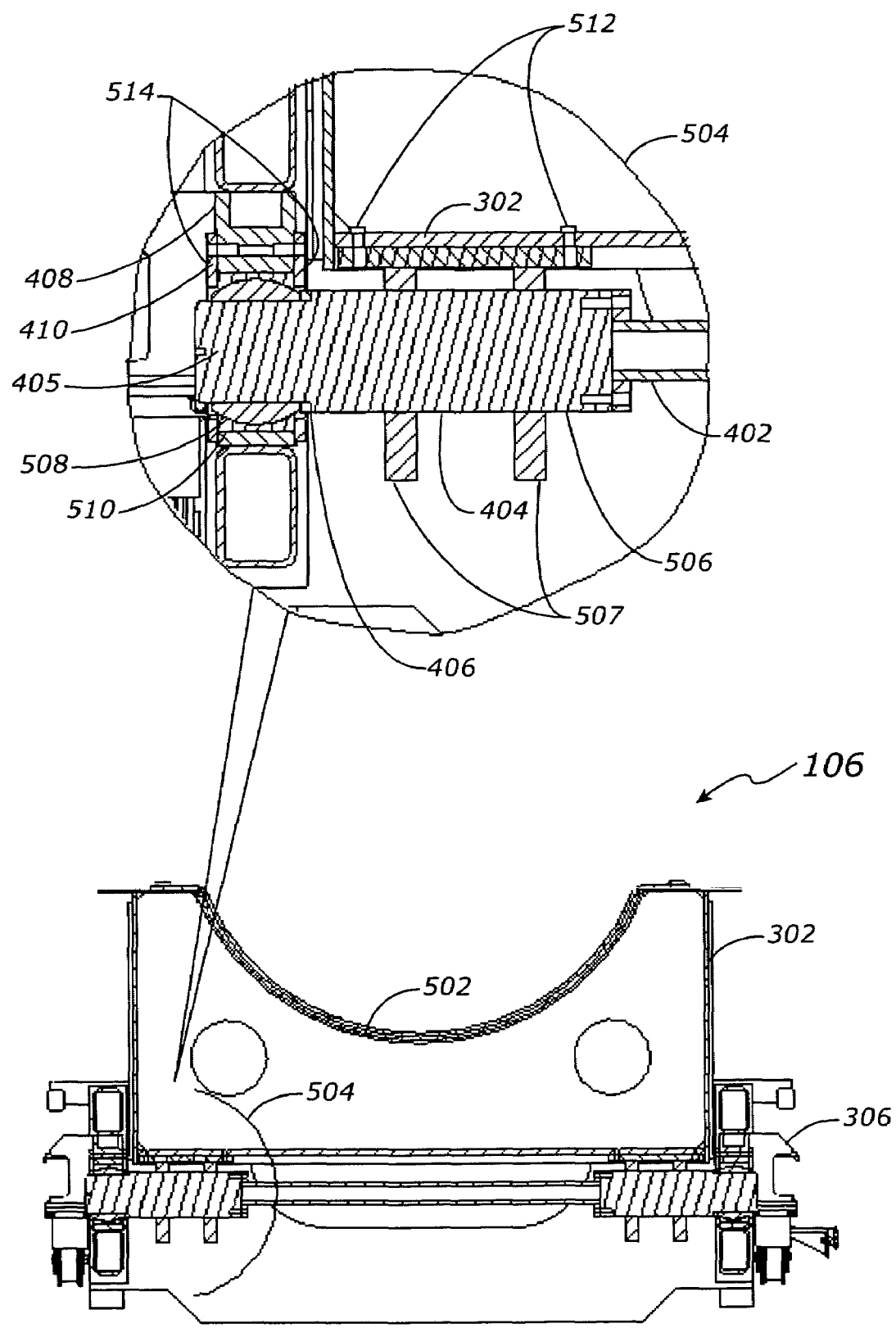
FIG. 5 is a cross-sectional view of an exemplary chock assembly, with inset detail of an exemplary cradle assembly.

FIG. 5 is a cross-sectional view of an exemplary chock assembly 106, with inset detail of an exemplary cradle assembly 504. Referring now to FIG. 5, chock assembly 106 suitably includes a chock 302 coupled to a trolley 306 via a pair of cradle assemblies 504. As briefly mentioned above, the inner surface 502 of chock 302 may be provided with a rubberized coating or the like to prevent slippage and to further maintain rocket engine 102 (FIG. 1) in position during transit and elevation.

Each cradle assembly 504 suitably includes a chock support bracket 507 welded or otherwise affixed to a shaft 506 that terminates in a trunnion 405, as described above. Bracket 507 is appropriately welded, bolted (e.g. using bolts 512) or otherwise fastened to chock 302 as appropriate. Shaft 506 may also be welded, bolted, integrally formed or otherwise attached to alignment shaft 402, which joins each pair of cradle assemblies 504 coupled to chock 302. Trunnion 405 is appropriately fitted within bearing assembly 410, which suitably includes a set of spherical bearings 508 interacting with an outer race 510 to allow smooth rotational movement of trunnion 405 with respect to ring support 408. Bearing assembly 410 and/or ring support 408 are held in position by retainer plates 514 as appropriate. The interface surfaces between bearings 508 and outer race 510 may further include a fluid and/or coating (e.g. a petroleum-based fluid, or a TEFLON or similar type of coating) to provide lubrication and/or damping as appropriate. Each of the components included within chock assembly 106 may be cast, molded or otherwise formed from any appropriate material such as iron, steel or other metal, or may be alternately formed from plastic, composite material or any other material in a wide range of alternate embodiments.

In operation, then, chock assembly 106 provides rotational movement of chock 302 with respect to trolley 306 with one or more cradle assemblies 504. Although the exemplary cradle assemblies shown herein include several interacting components, alternate embodiments may include different structures and/or components. Rotational movement may be provided with any type of hinge or joint structure such as a universal joint, a ball-and-socket arrangement, any type of bearing assembly or the like. Similarly, the actual shapes and interactions of the various components (e.g. shaft 506, support bracket 507, trunnion 405 and the like) may vary widely from embodiment to embodiment. Further, although pivoting movement typically takes place in response to force applied against chock 106 by rocket engine 102, a hydraulic-based or other drive and/or positioning mechanism may be provided in an alternate embodiment.

Figure 6:
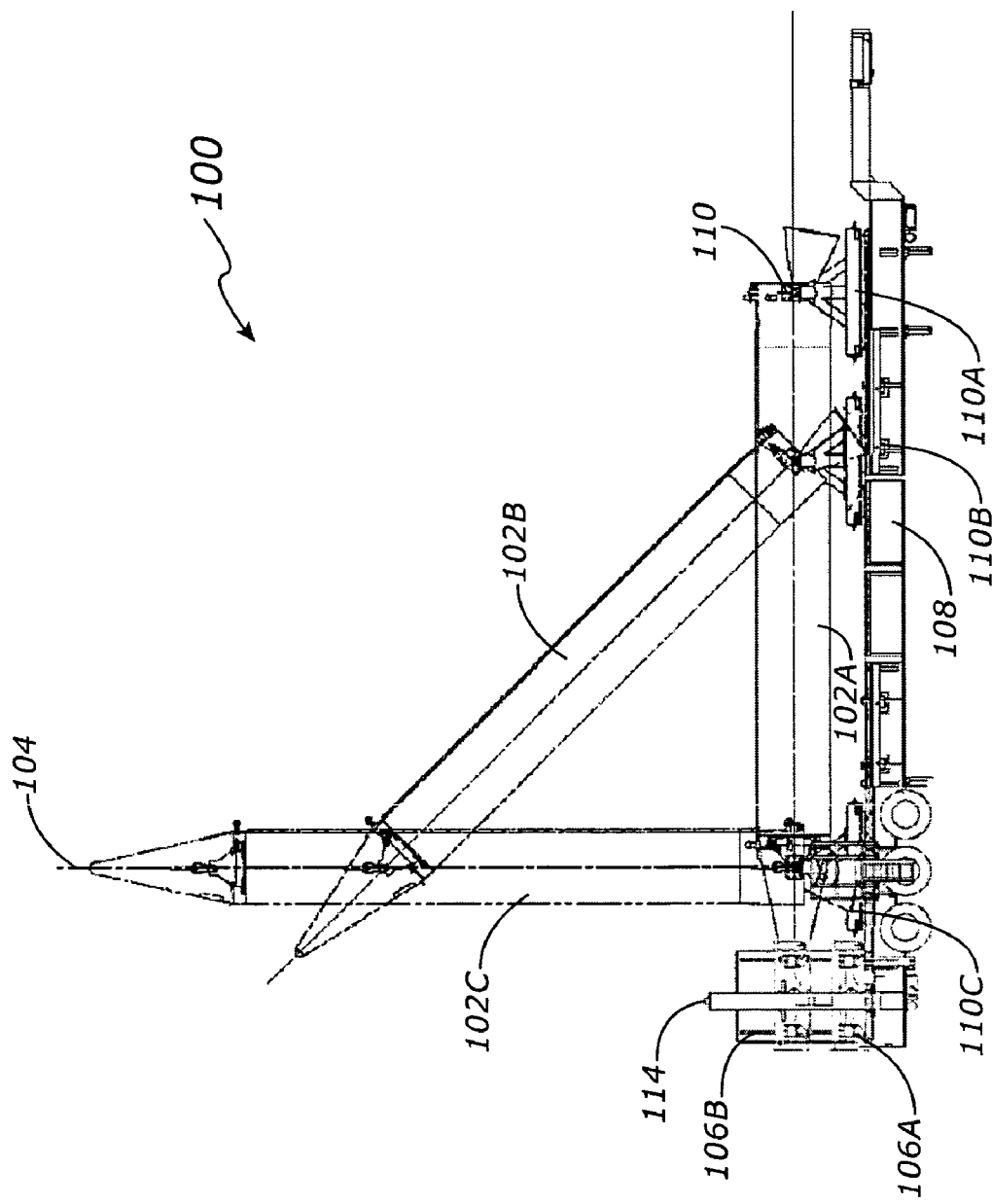
FIG. 6 is a side view of an exemplary transport during elevation of a rocket engine.

With final reference now to FIG. 6, transport 100 suitably elevates rocket engine 102 by providing an upward force upon the forward end of the engine. As the forward end is lifted above transport 100, engine 102 suitably rotates about pin 202, which is supported by notch 204 (FIG. 2) in tail support member 110. Further, tail support member may be further configured to move laterally along transport 100 such that the tail of engine 102 is underneath lift 104, as shown by the position of rocket engine 102C in FIG. 6. Each of the chocks 106A-B present within transport 100 similarly move in a lateral direction to interact with lift 114, which appropriately positions and/or stores chocks 106A-B during and after elevation of engine 102.

Accordingly, a new transport 100 and chock 106 are provided that reduce spot loading on the leading edges of the chocks during elevation of the rocket engine or other object. The chock is allowed to rotate about an axis perpendicular to the long axes of the transport and the object such that the chock remains substantially flush with the object during elevation. Because the weight of the object remains distributed across the chock during the elevation process, spot loading on the edge of the chock is significantly reduced, thereby reducing a potential source of damage to the object.

While at least one exemplary embodiment has been presented in the foregoing detailed description, it should be appreciated that a vast number of variations exist. The concepts described herein with respect to rocket engines or solid rocket motors, for example, are readily applied to transport of vehicles and other objects. Similarly, the various mechanical structures described herein are provided for purposes of illustration only, and may vary widely in various practical embodiments. Accordingly, the various exemplary embodiments described herein are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that numerous changes can be made in the selection, function and arrangement of the various elements without departing from the scope of the invention as set forth in the appended claims and the legal equivalents thereof.

What is claimed is:

1. A rocket engine transport, comprising:
    a trailer having a long axis which extends along a lengthwise dimension of the trailer, wherein the trailer comprises a track which extends along the lengthwise dimension of the trailer;
    a tail support member coupled to the trailer and having a notch configured to receive a pin attached to a distal end of the rocket engine; and
    a chock assembly comprising a chock pivotably coupled to a trolley, wherein the chock is configured to accept the rocket engine, wherein the trolley is coupled to the trailer via the track, and wherein the trolley is configured to move laterally within the track in a direction substantially parallel to the long axis, and wherein the chock is configured to pivot about a rotation axis that is substantially perpendicular to the long axis of the trailer in response to a force applied against the chock by the rocket engine as a second end of the rocket engine is elevated to a position that is substantially perpendicular to the long axis.

2. The transport of claim 1 wherein the chock assembly further comprises a bearing assembly pivotably coupling the chock to the trolley.

3. The transport of claim 2 wherein the chock assembly further comprises a cradle assembly comprising a support bracket coupled to the chock.

4. The transport of claim 3 wherein the support bracket comprises a trunnion configured to cooperate with the bearing assembly to thereby allow the chock to pivot with respect to the trolley.

5. The transport of claim 4, wherein the bearing assembly comprises a first bearing assembly, and wherein the cradle assembly comprises a first cradle assembly, and wherein the chock assembly further comprises:
    a second bearing assembly; and
    a second cradle assembly coupled to the chock and having a second trunnion configured to interface with the second bearing assembly.

6. The transport of claim 5 further comprising a shaft interconnecting the first and second cradle assemblies.

7. A rocket engine transport comprising:
    a trailer having a track running parallel to a longitudinal axis which extends
        along a lengthwise dimension of the trailer, wherein the trailer comprises
        a track which extends along the lengthwise dimension of the trailer;
    a tail support member coupled to the trailer and having a notch configured to rotatably receive a pin attached to a distal end of a rocket engine; and
    a chock assembly comprising:
    a chock,
    a trolley coupled to the trailer via the track, and wherein the trolley is configured to move laterally within the track in a direction substantially parallel to the longitudinal axis, a pair of bearing assemblies rotatably coupling the chock to the trolley, and a pair of cradle assemblies, each cradle assembly comprising a support bracket coupled to the chock and having a trunnion configured to interact with the bearing assembly, wherein the chock is configured to accept the rocket engine and to pivot on the trunnion about a rotation axis that is substantially perpendicular to the longitudinal axis in response to a force applied against the chock by the rocket engine as a second end of the rocket engine is elevated to a position that is substantially perpendicular to the longitudinal axis.

8. The rocket engine transport of claim 7, wherein the chock further comprises an edge, and wherein the chock pivots with the engine about the rotation axis to maintain substantially flush contact with the rocket engine as the second end of the rocket engine is elevated to distribute weight of the rocket engine across the chock to prevent localized loading on the edge of the chock.

9. The rocket engine transport of claim 7, wherein the tail support member and the chock move along the track until the rocket engine is fully erect.

10. An object transport, comprising:

a trailer having a longitudinal axis which extends along a lengthwise dimension of the trailer, wherein the trailer comprises a track which extends along a lengthwise dimension of the trailer;

a tail support member coupled to the trailer and having a notch configured to receive a pin attached to a distal end of an object; and a chock assembly comprising a chock and a trolley coupled to the trailer via the track, and wherein the trolley is configured to move laterally within the track in a direction substantially parallel to the longitudinal axis of the trailer, and wherein the chock is configured to accept the object and to pivot about a pivot point on the trolley about a rotation axis that is substantially perpendicular to the longitudinal axis in response to a force applied against the chock by the object as a second end of the object is elevated to a position that is substantially perpendicular to the longitudinal axis.

11. An object transport, comprising:

a trailer having a track running parallel to a longitudinal axis which extends along a lengthwise dimension of the trailer, wherein the trailer comprises a track which extends along a lengthwise dimension of the trailer;

a tail support member coupled to the trailer and having a notch configured to rotatably receive a pin attached to a distal end of an object; and a chock assembly comprising a chock, a trolley coupled to the trailer via the track, and wherein the trolley is configured to move laterally within the track in a direction substantially parallel to the longitudinal axis of the trailer, a pair of bearing assemblies rotatably coupling the chock to the trolley, and a pair of cradle assemblies, each cradle assembly comprising a support bracket coupled to the chock and having a trunnion configured to interact with the bearing assembly, wherein the chock is configured to accept the object and to pivot about a rotation axis that is substantially perpendicular to the longitudinal axis in response to a force applied against the chock by the object as a second end of the object is elevated to a position that is substantially perpendicular to the longitudinal axis.

* * * * *